United States Patent

Frizell

Patent Number: 5,888,392
Date of Patent: Mar. 30, 1999

[54] FILTER POSITION RETENTION RING

[76] Inventor: Thomas Frizell, 105 Pleasant Ave., East Haven, Conn. 06512

[21] Appl. No.: 953,900

[22] Filed: Oct. 20, 1997

Related U.S. Application Data

[63] Continuation-in-part of Ser. No. 772,566, Dec. 26, 1996, abandoned.

[51] Int. Cl.$^6$ .................................................. B01D 29/085
[52] U.S. Cl. ......................... 210/238; 210/474; 210/478; 210/479; 99/295; 24/20 R; 24/20 S
[58] Field of Search ..................................... 210/232, 238, 210/478, 474, 479, 480; D7/400; 99/295; 24/20 R, 546, 555, 556, 20 S

[56] References Cited

U.S. PATENT DOCUMENTS

| | | |
|---|---|---|
| D. 317,388 | 6/1991 | White . |
| D. 322,735 | 12/1991 | Morton . |
| D. 341,059 | 11/1993 | Watson . |
| D. 349,833 | 8/1994 | Enos . |
| 4,656,932 | 4/1987 | Kopp . |
| 4,885,987 | 12/1989 | Franke . |
| 5,252,211 | 10/1993 | Searfoss . |
| 5,507,948 | 4/1996 | Wargo . |
| 5,536,393 | 7/1996 | Weeks . |

Primary Examiner—Thomas M. Lithgow
Attorney, Agent, or Firm—Alfred E. Miller

[57] ABSTRACT

The present invention relates to filters for coffee, tea, hot chocolate etc., in which a filter is placed in a cylindrical container and whatever is to be filtered is placed in the filter that has been placed in the cylindrical container. Thereafter, either hot or ice cold water, in the case of iced tea, is poured into the cylindrical container over that which is to be filtered. In more cases than not, the filter collapses, especially in the case of coffee and tea, the result is that coffee grinds and tea leaves eventually get into the coffee cup or tea leaves get into the tea cup. The present invention solves this problem by providing a retention ring of shape retaining inert material, such as plastic or stainless steel that is capable of being compressed in size placing it inside the filter that has been placed in the cylindrical container that is to be filled with a product. The retention ring, when released from compression, returns to its original shape and holds the filter tight against the walls of the cylindrical container, thereby eliminating the contamination in the user's cup.

3 Claims, 5 Drawing Sheets

FILTER POSITION RETENTION RING

This application is a continuation-in-part of application Ser. No. 08/772,566, filed Dec. 26, 1996, now abandoned.

FIELD OF THE INVENTION

The present invention relates to the home brewing by filtering product though a filter and pouring either hot or ice cold water over product therein. More particularly, the present invention relates to a means to prevent the contamination of the user's cup with unfiltered product that has escaped the filter.

OBJECTS OF THE PRESENT INVENTION

An object of the present invention is to provide a means to prevent a filter from collapsing in its container and allowing product to pass through unfiltered to the user's cup.

Another object of the present invention is to provide a retention ring to prevent the filter from collapsing and that does not contaminate the product.

These together with other objects of the present invention, along with the various features of novelty which characterize the present invention, are pointed out with particularity in the appended claims forming part hereof. For a better understanding of the present invention, its operating advantages and the specific objects obtained by the user, reference is made to the accompanying drawings and descriptive matter in which there is illustrated preferred embodiments of the present invention.

BACKGROUND OF THE INVENTION

A search was made to determine the novelty of the present invention and the following Patents were found to be related to the field of the invention. However, none of the cited Patents disclose the invention herein described and claimed. The Patents found are as follows:

U.S. Pat. No. 802,095 issued to A, R. Draught on 17 Oct. 1905, entitled Coffee Strainer which discloses a means to strain coffee in a drip pot by providing a textile material filter bag to be put inside the pot. There is not even the slightest suggestion of the spring steel or suitable plastic retention ring that will return to its original shape when released from it's compression in order to hold a paper filter tight against the wall of the coffee, tea, hot chocolate, etc. machine well to prevent said paper filter from collapsing and coffee grinds, etc. from passing through to the drinkers cup U.S. Pat. No. 909,528 issued C. F. Blanke on 12 Jan. 1909, entitled China Coffee Pot which discloses another drip coffee pot that has inside a strainer bag that is held in place by the lid or cover of the coffee pot. The strainer bag is disclosed as being made of woven muslin or suitable fabric. There is not even the slightest suggestion of the spring steel or suitable plastic retention ring that will return to it's original shape when released from it's compression in order to hold a paper filter tight against the wall of the coffee, tea, hot chocolate, etc. machine well to prevent said paper from collapsing and coffee grinds, etc. from passing through to the drinkers cup.

U.S. Pat. No. 1,704,879 issued to B. C. Brougham on 04 Jan. 1929 entitled Coffee Percolator Sediment Collector which discloses a percolator coffee pot that employs a linen or cotton filter bag with a ring of coil steel inside the top edge of his material filter bag thereby making said bag contract to foam puckers around the top of the bag which is supposed to prevent coffee particles and sediment from getting out of the bag. While this rudimentary attempt to prevent sediment from getting in to the coffee cup, there is not even the slightest suggestion of the spring steel or suitable plastic that will return to it's original shape when released from its compression to hold a paper filter tight against the wall of the coffee, tea, hot chocolate, etc. machine well to prevent said filter from collapsing and coffee grinds etc. from passing through to the drinkers cup.

U.S. Pat. No. 2,429,389 issued to G. C. Calentine on 21 Oct. 1947 entitled Combination Urn Bag Ring which discloses a coffee urn ring to hold a material filter bag on a support on the top of the coffee urn and incorporated in said ring is a triangular handle to allow the used coffee to be carried off to be disposed, without the danger of burning the user's hand with the hot bag or grinds. There is not even the slightest suggestion of the spring steel or suitable plastic retention ring that will return to it's original shape when released from compression to hold a paper filter tight against the wall of the coffee, tea, hot chocolate, etc. machine well to prevent said filter from collapsing and coffee grinds etc. from passing through to the drinkers cup.

SUMMARY OF THE INVENTION

The present invention relates to a retention ring that is placed inside the cylindrical member well of a coffee, etc. machine into which the filter is placed and thereafter the product is placed in the filter, in order to hold said filter tight against the walls of said cylindrical member well. In more cases than the consumer cares to count, after the filter is placed in said cylindrical member well, the filter collapse and when, for example, coffee is placed, coffee gets around and under the filter, so when the hot water is poured over the coffee and filter, all of the coffee that has gotten around and under the collapsed filter, eventually goes into the filtered coffee and in to the drinker's cup. The retention ring of the present invention corrects this problem by holding the filter tight against the walls of the cylindrical member thereby preventing coffee from getting around and under a collapsed filter. The removal of this problem adds to both the appearance and palatableness of the beverage.

While the retention ring of the present invention is being described with relations to a coffee machine for reasons of simplicity, it should be recognized that the ring is equally applicable to any other filter system and filter sizes, such as tea, iced tea, hot chocolate, etc. The retention ring of the present invention may be constructed of any non-contamanable material that has memory and will return to it's original shape when released, examples of such materials are certain plastics, stainless steel, etc.

There has thus been outlined, rather broadly, the more important features of the present invention in order that the detailed description thereof that follows may be better understood and in order that the present invention and those skilled in the art may better appreciate it thereby. There are, of course, additional features of the present invention that will be described hereinafter and which will be described hereinafter and form the subject matter of the claims appended hereto.

In this respect, before explaining at least one embodiment of the present invention in detail, it is to be understood that the present invention is not limited in its application to the details of construction and to the arrangements of construvtion set forth in the following or illustrated in the appended drawings. The present invention is capable of other embodiments and of being practiced and carried out in various ways. Also, it is to be understood that the phraseology and terminology employed herein are for the purposes of description and should not be regarded as limiting.

As such those skilled in the art will appreciated that the conception, upon which this disclosure is based, may readily be utilized as a basis for designing of other structures, methods and systems for carrying out the several purposes of the present invention. It is important, therefore, that the claims be regarded as including such equivalent constructions in so far as they do not depart from the spirit and the scope of the present invention.

DETAILED DESCRIPTION OF THE PREFERRED EMBODIMENT OF THE PRESENT INVENTION

Figure 2:
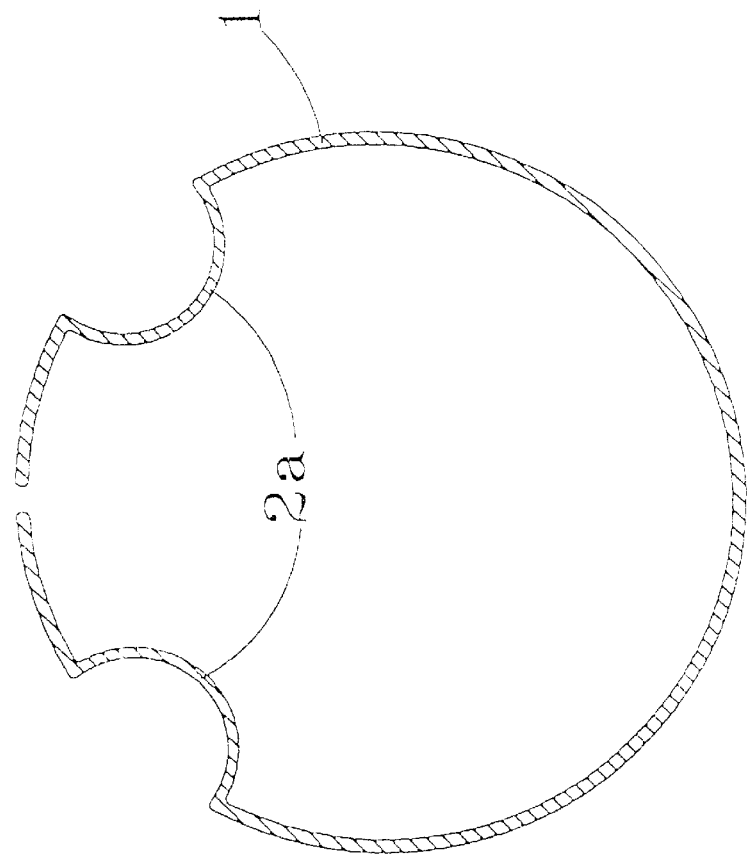
FIG. 2 is a top view of another embodiment of the filter retention ring of the present invention.
Figure 1:
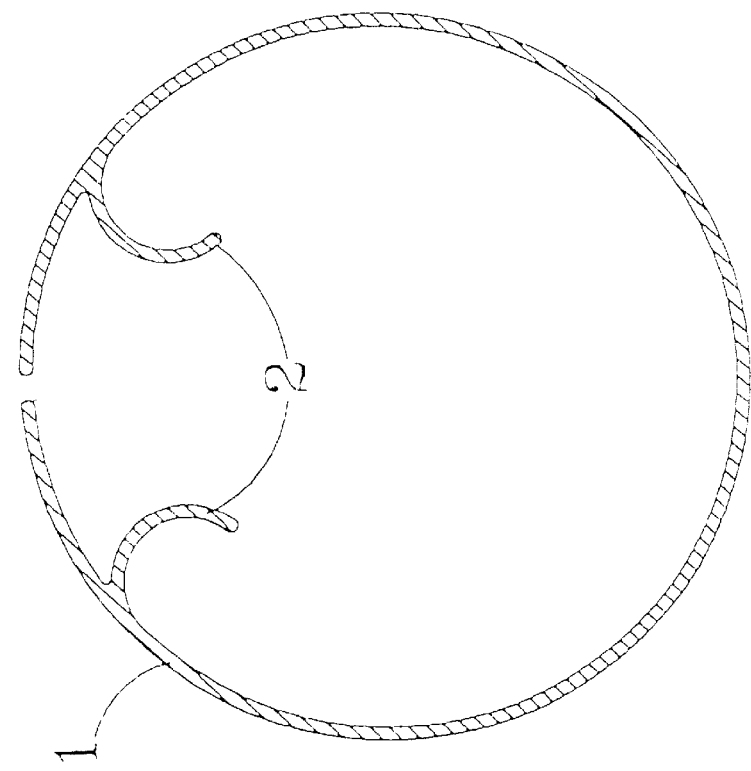
FIG. 1 is a top view of one embodiment of the filter retention ring of the present invention.
Figure 3:
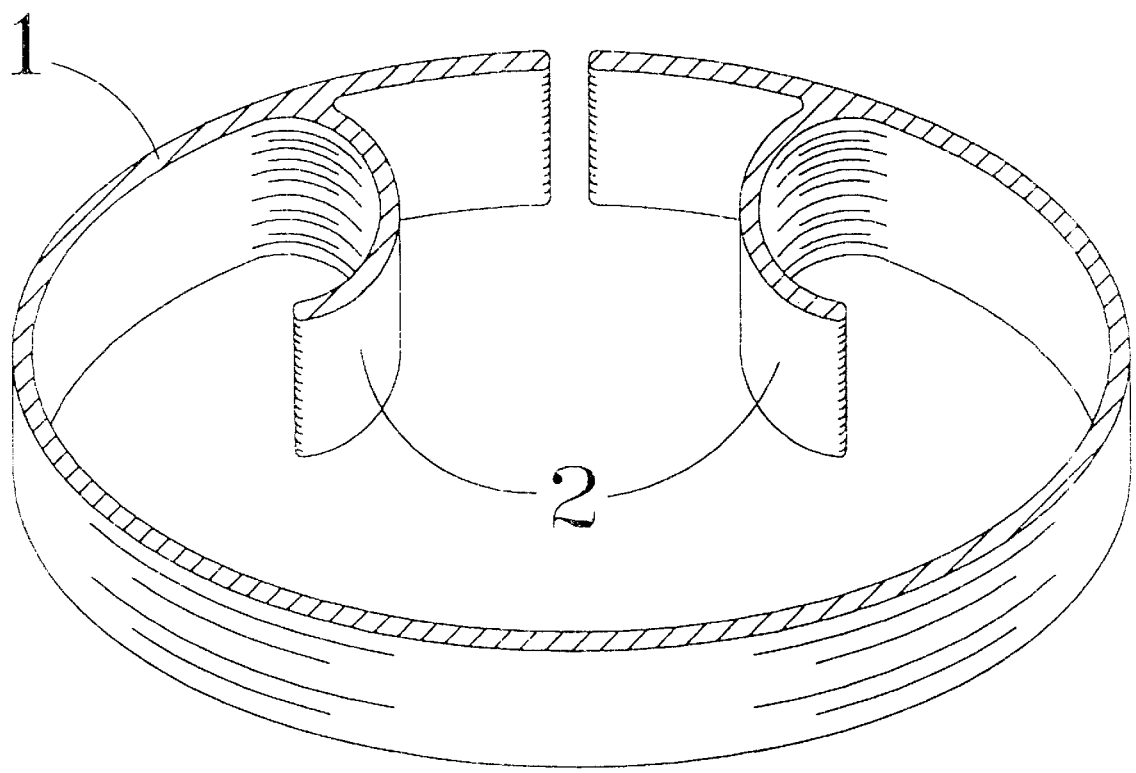
FIG. 3 is a perspective front view of the ring embodiment in FIG. 1.
Figure 4:
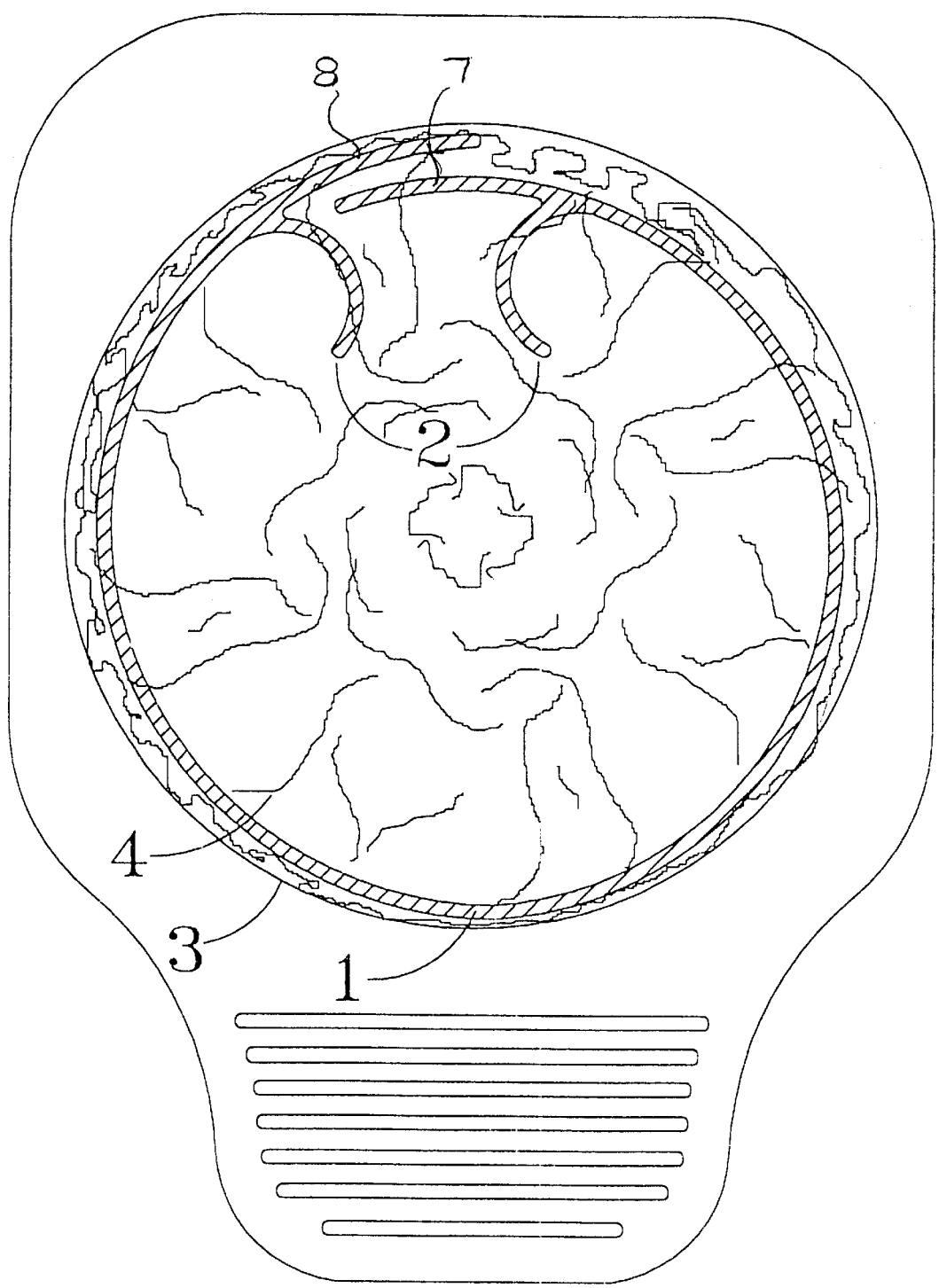
FIG. 4 is a top view of the retention ring still in the compressed condition in the filter well of a coffee machine.
Figure 5:
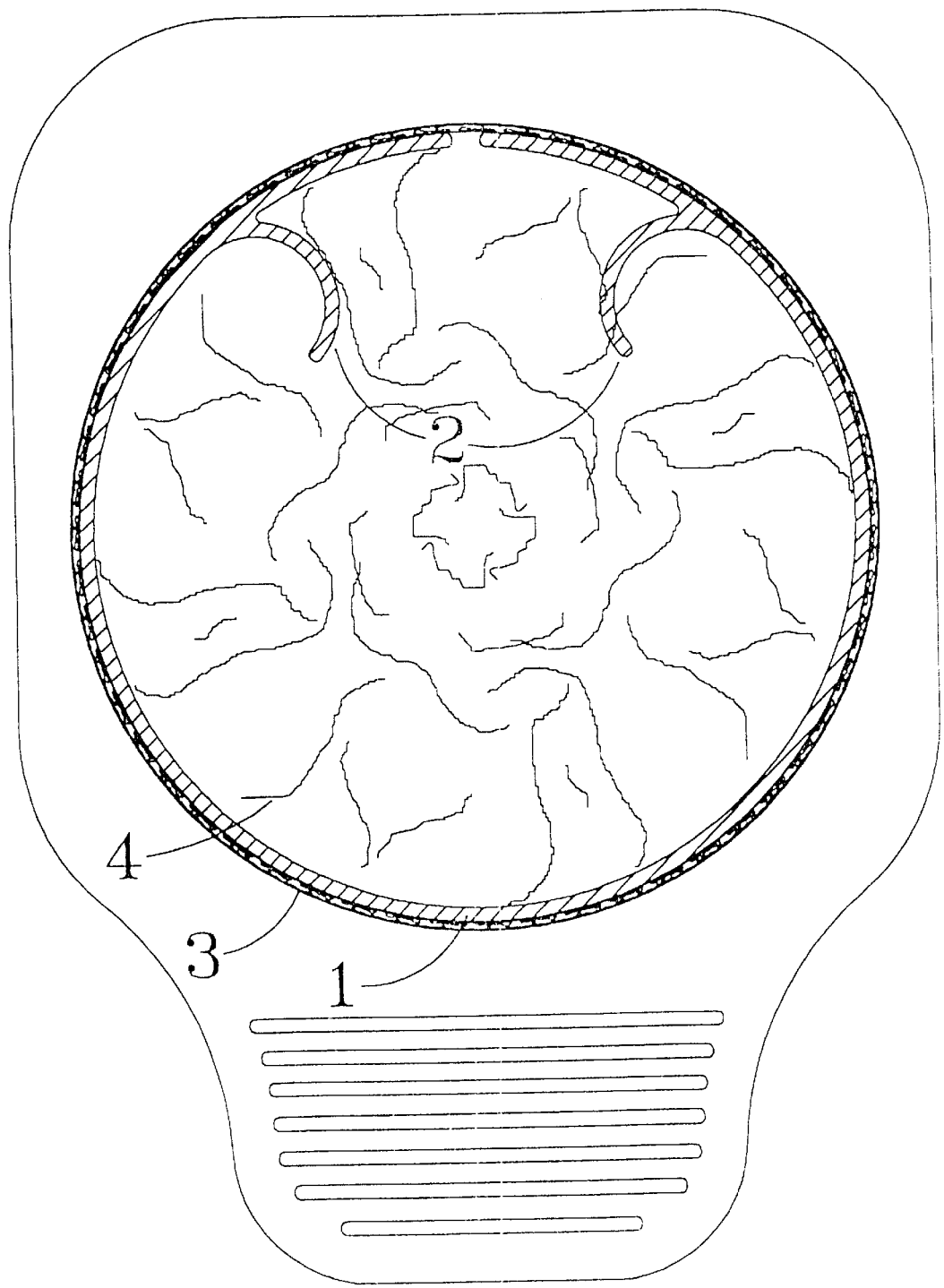
FIG. 5 is a top view of the retention ring now in the released condition in the filter well of a coffee machine.
Figure 6:
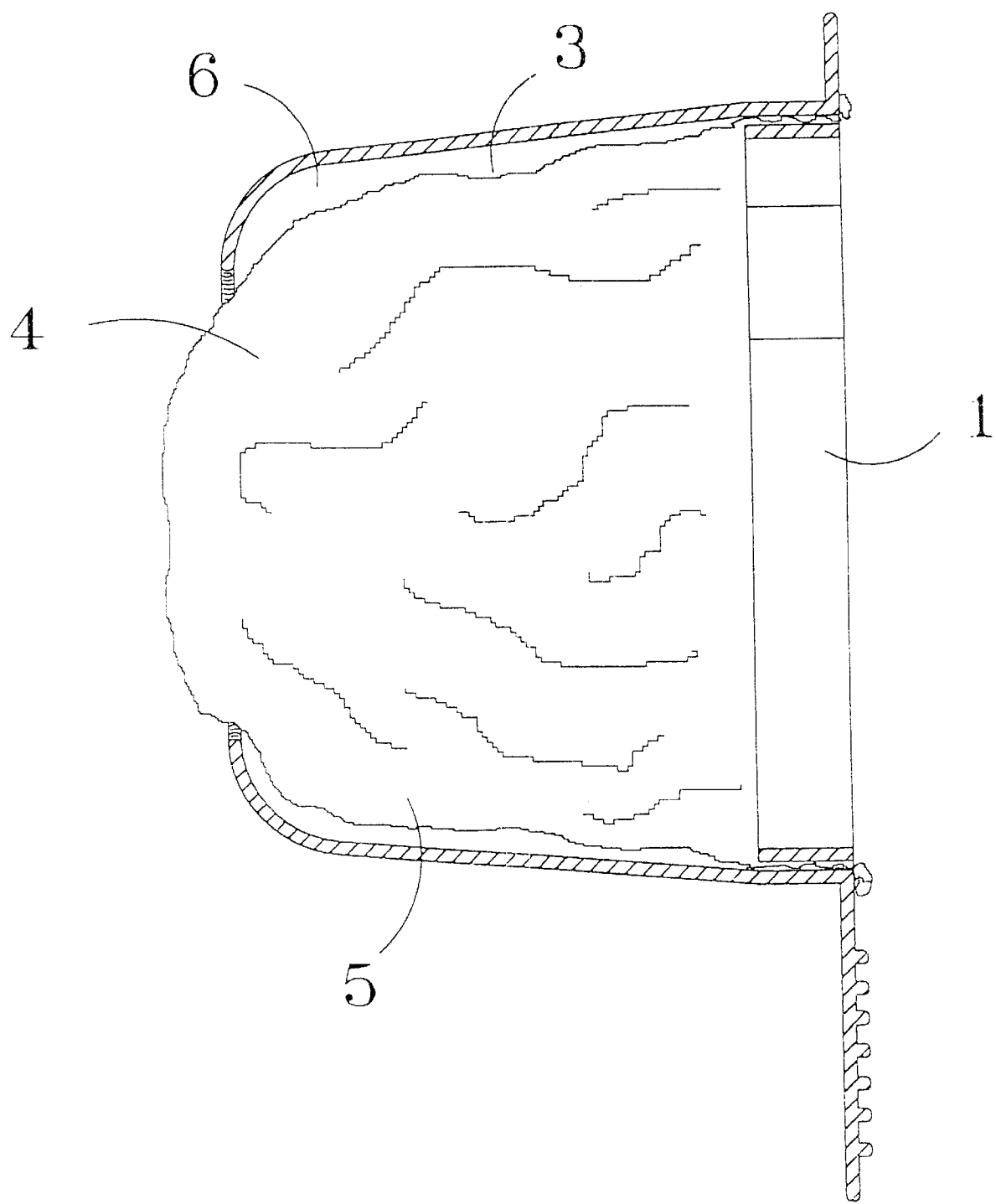
FIG. 6 is a sectional view taken on line 6—6 of FIG. 5 showing the filter well, having the filter, coffee and the retention ring in place.

Referring now to the drawing, FIG. 1 shows the preferred embodiment of the present invention with the ring in a non-compressed position at 1 and the finger compressing means at 2. FIG. 2 shows the altenate embodiment with out the finger compression rings 2 but with comression impressions 2a in ring 1 to allow the user a better grip for compression and release. As the ring 1 is compressed with compressing ring means 2 its diameter is reduced which allows the user to place it inside a filter 4 shown in FIGS. 4 still in the compressed position and in FIG. 5 in the expanded position holding the filter 4 against the filter well wall 3. As seen in FIG. 4 the ring has free ends 7 and 8 and shaped finger holds 9 and 10 adjacent to the free ends. It should be noted that ring 1 is a single unitary piece but with the finger holds 9 and 10 being extruded from the ring 1 while the remainder of the ring is formed as free ends continuing in the normal curvature of the ring but is not connected to form an open ring. A distinct advantage of this construction is clearly seen in FIG. 4 in which the free ends 7 and 8, when being compressed, can pass each other in opposite directions, thereby permitting the filter retaining ring to be reduced in size for a universal application to a wide variety of diameters of filter wells FIG. 5 shows retention ring 1 in the expanded position holding filter 4 against well wall 3 thereby preventing the collapse of filter 4 from collapsing and the coffee grinds 5 from getting behind and under collapsed filter 4. FIG. 2 shows another embodiment with the retention ring 1 free of separate compressing rings means 2. While this simpler configuration, it has been found that by compressing the ring 1 by hand from the out side is not as efficient as by compressing said ring by utilizing the compressing means 2 as shown in FIG. 1 and placing the ring 1 inside the filter as shown in FIG. 4. From FIG. 3 it can be seen that the width of ring 1 is important, if the ring 1 is very thin, it will not hold the filter tight enough against the wall of the coffee basket. The width is clearly shown in the perspective view of FIG. 3. FIG. 6. a sectional view of FIG. 5 taken on line 6—6 wherein like figures indicate like parts the coffee grinds are shown at 5.

The filter retention ring 1 of the present invention is a simple but efficient means of correcting the well known problem in home brewing of coffee, tea, etc., namely having the unfiltered coffee grinds and tea leaves end up in the user's cup. The present invention is easy to use and is reusable and may be packaged either with the filters or with the machines and solves a problem that has existed at lease from the time of the Darragh Patent, 1909.

The method in which the retention ring of the present invention operates is the following steps:

a. place a paper filter into the filtering well of a beverage brewing machine, b. compressing said retention filter ring, place inside said placed filter, c. releasing said compressed retention ring, allowing said retention ring to hold said paper filter against the wall of said filtering well, thereby preventing collapsing of said paper filter, and d. pouring hot or iced water over the drink material that has been placed in the supported filter.

In view of the above, it will be seen that the several objects of the present invention are achieved and other advantageous results are attained.

While the description supra., contains many specificities, the reader should not construe these to be limitations on the scope of the invention, but merely as exemplifications of a preferred embodiment of the present invention. Those skilled in the art will envision that many other possible variations are within the scope of the present invention. For example, skilled artisans will readily be able to change the dimensions and the materials of the various embodiments. They can make many variations on the design of the present invention. Accordingly, the reader is requested to determine the scope of the present invention only by the scope of the appended claims and their legal equivalents, taken in view of the scope of this specification, and not by the examples that have been given herein.

What I claim is:

1. An open ended filter shape retention ring having opposing free ends thereof spaced from each other comprising: a narrow strip shaped compressible open ring capable of returning to its original shape, and said narrow strip shaped compressible open ring having a main ring section and opposed end sections, each opposed end section being bifurcated to form a first portion which defines a cantilevered, inwardly directed, continuously curved finger hold which curves back toward the main ring section and has a terminal end spaced from said main ring section, and a second portion which extends in the normal curvature of the main ring section, each second portion having a terminal end which defines said opposing free ends which have an opening there between when said ring is in its original shape, whereby said ring free ends upon compression of said finger holds passing each other in opposite directions to reduce the diameter of said ring.

2. The retention ring of claim 1, wherein said ring, is adapted to be placed in the well of a brewing machine, being adapted to expand to its original shape, thereby holding said filter tight against the walls of said filtering well.

3. The retention ring of claim 1, wherein said retention ring is composed of material capable of returning shape to its original shape after it has been compressed and released, selected from the group consisting of spring stainless steel and a plastic having shape retention properties.

* * * * *